US011187581B2

(12) United States Patent
Kokota et al.

(10) Patent No.: US 11,187,581 B2
(45) Date of Patent: Nov. 30, 2021

(54) MICRO-SPECTROMETRY MEASUREMENT METHOD AND SYSTEM

(71) Applicant: HORIBA FRANCE SAS, Longjumeau (FR)

(72) Inventors: Alexandre Kokota, Lezennes (FR); Vasyl Shynkar, Wasquehal (FR); Cédric Marchessoux, Halluin (FR)

(73) Assignee: HORIBA FRANCE SAS, Longjumeau (FR)

( * ) Notice: Subject to any disclaimer, the term of this patent is extended or adjusted under 35 U.S.C. 154(b) by 0 days.

(21) Appl. No.: 16/480,173

(22) PCT Filed: Jan. 23, 2018

(86) PCT No.: PCT/EP2018/051608
§ 371 (c)(1),
(2) Date: Jul. 23, 2019

(87) PCT Pub. No.: WO2018/138098
PCT Pub. Date: Aug. 2, 2018

(65) Prior Publication Data
US 2019/0391012 A1    Dec. 26, 2019

(30) Foreign Application Priority Data
Jan. 24, 2017    (EP) .................................... 17305076

(51) Int. Cl.
*G01J 3/28* (2006.01)
*G01J 3/44* (2006.01)
(Continued)

(52) U.S. Cl.
CPC .............. *G01J 3/2823* (2013.01); *G01J 3/44* (2013.01); *G02B 7/38* (2013.01); *G02B 21/006* (2013.01);
(Continued)

(58) Field of Classification Search
CPC . G01J 3/027; G01J 3/2823; G01J 3/44; G02B 21/002; G02B 21/0036;
(Continued)

(56) References Cited

U.S. PATENT DOCUMENTS 4,945,220 A    7/1990 Mallory et al.
5,790,710 A    8/1998 Price et al.
(Continued)

FOREIGN PATENT DOCUMENTS

DE    10 2012 021726    5/2014
WO    WO 2014/005866    1/2014

OTHER PUBLICATIONS

International Search Report, PCT/EP2018/051608, dated Jul. 9, 2018.
(Continued)

*Primary Examiner* — Sunghee Y Gray
(74) *Attorney, Agent, or Firm* — Nixon & Vanderhye

(57) ABSTRACT

Disclosed is an optical micro-spectrometry system including an optical microscope, a spectrometry system and an optical system adapted to direct an excitation light beam on the sample through the at least one microscope objective and to collect a Raman or PL light beam from a sample. The optical micro-spectrometry system includes an imaging system configured for acquiring a first image and a second image of the sample, by reflection or transmission of an illumination beam from a sample surface, the first image having a large field of view and the second image having a small field of view, a processing system configured for determining an area in the first image corresponding to the second image, a display system configured for displaying the first image, the second image, and a third image representing the area in overlay on the first image.

7 Claims, 3 Drawing Sheets

(51) Int. Cl.
*G02B 7/38* (2021.01)
*G02B 21/00* (2006.01)
*G02B 21/24* (2006.01)
*G02B 21/36* (2006.01)

(52) U.S. Cl.
CPC ........ *G02B 21/244* (2013.01); *G02B 21/0036* (2013.01); *G02B 21/367* (2013.01)

(58) Field of Classification Search
CPC .. G02B 21/006; G02B 21/244; G02B 21/367; G02B 7/38
USPC .......................................................... 356/302
See application file for complete search history.

(56) References Cited

U.S. PATENT DOCUMENTS

| | | | |
|---|---|---|---|
| 10,395,498 B2* | 8/2019 | Mills | G06K 9/00771 |
| 2006/0142662 A1* | 6/2006 | Van Beek | A61B 5/0075 |
| | | | 600/476 |
| 2010/0214430 A1* | 8/2010 | De Boer | G02B 21/16 |
| | | | 348/222.1 |
| 2012/0081536 A1* | 4/2012 | Kuppig | G02B 21/367 |
| | | | 348/79 |
| 2012/0314206 A1* | 12/2012 | Spizig | G02B 21/006 |
| | | | 356/72 |
| 2015/0029326 A1* | 1/2015 | Backman | G02B 21/06 |
| | | | 348/80 |
| 2016/0266362 A1* | 9/2016 | Kapanidis | G02B 7/28 |
| 2018/0143415 A1* | 5/2018 | Hollricher | G02B 21/006 |
| 2019/0297262 A1* | 9/2019 | Chen | H04N 5/23212 |

OTHER PUBLICATIONS

Simply Better Raman: "Chemical Analysis & Imaging for Research & Industry", Jun. 1, 2016 (Jun. 1, 2016), XP055393452, Retrieved from the Internet: URL:http://www.horiba.com/fileadmin/upload s/Scientific/Documents/Raman/Brochure XploRA_Series-062016-B.pdf [retrieved on Jul. 25, 2017] the whole document.

Jordan et al., "Highly Accurate Non-Contact Characterization of Engineering Surfaces Using Confocal Microscopy", Meas. Sci. Technol, 9 (1998) 1142-1151, vol. 9, No. 7, 1998.

Brenner et al., "An Automated Microscope for Cytologic Research a Preliminary Evaluation", The Journal of Histochemistry and Cytochemistry, vol. 24, No. 1, pp. 100-111, 1976.

* cited by examiner

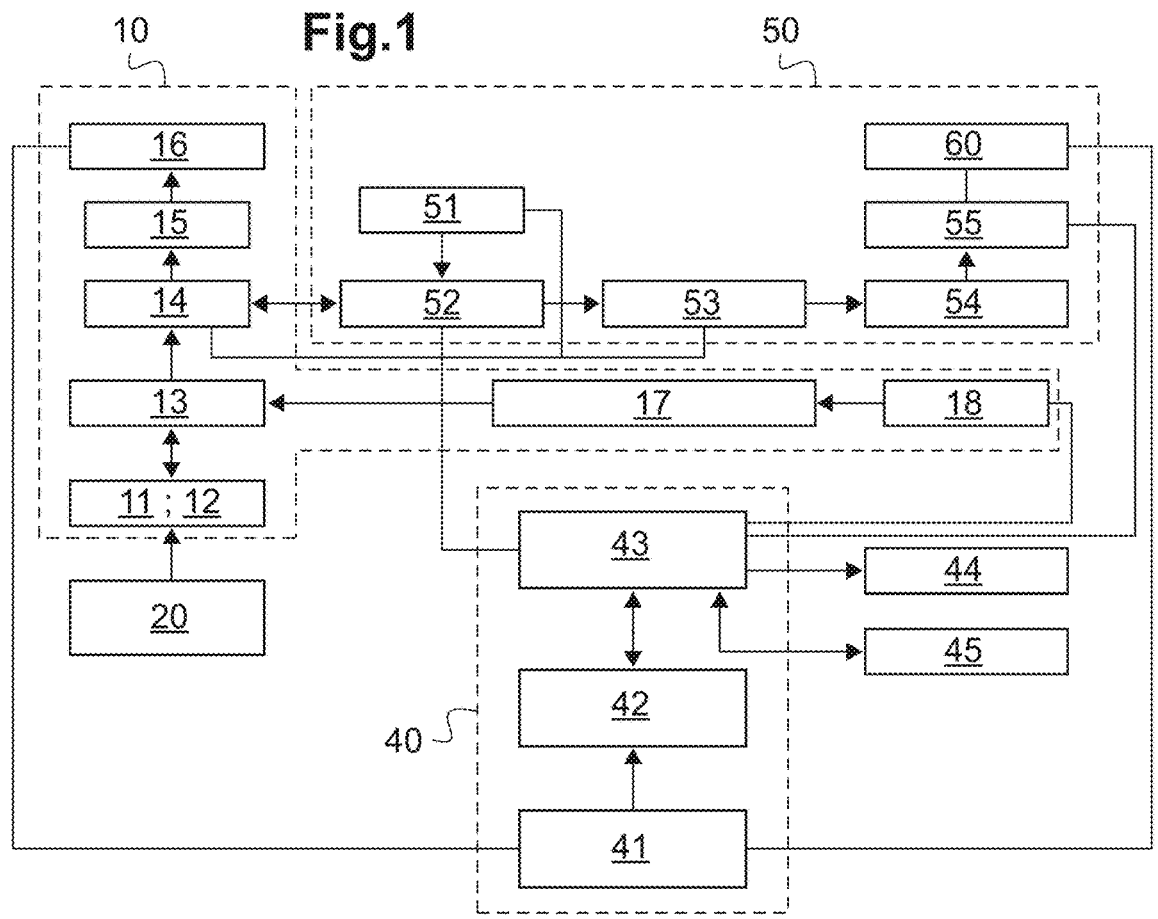
Fig.1
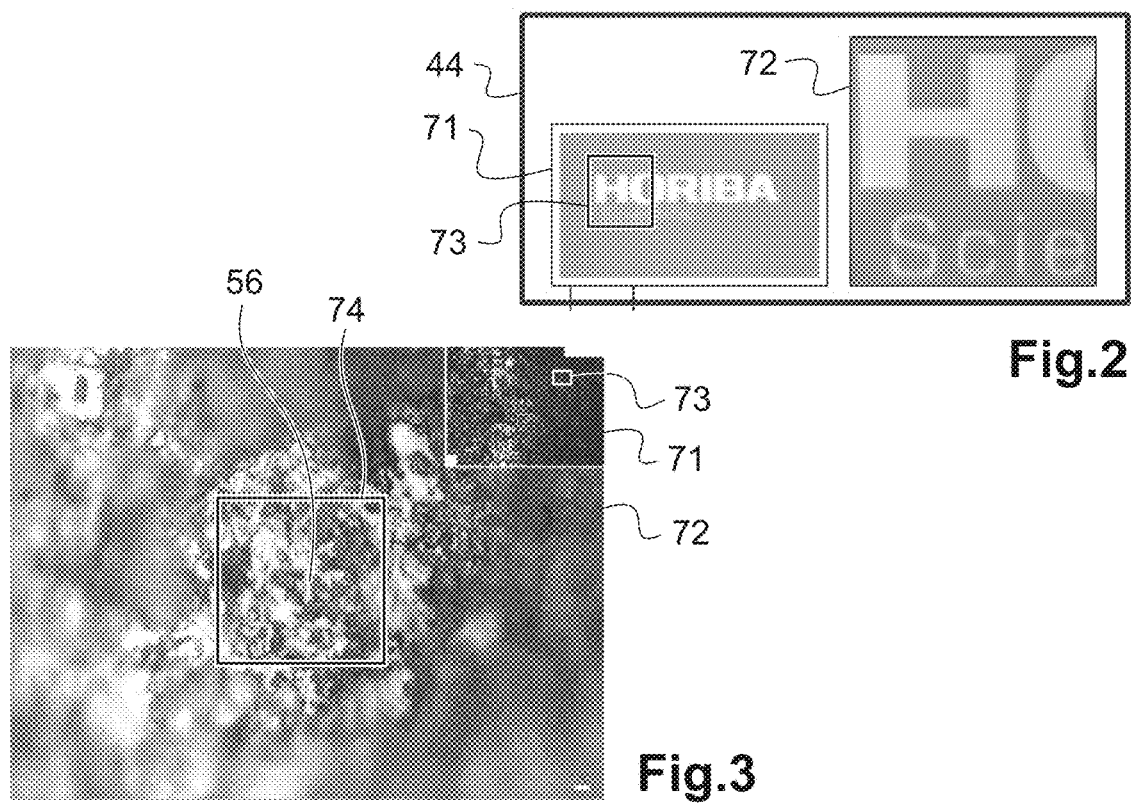
Fig.2
Fig.3

Fig.4A Z=140μm 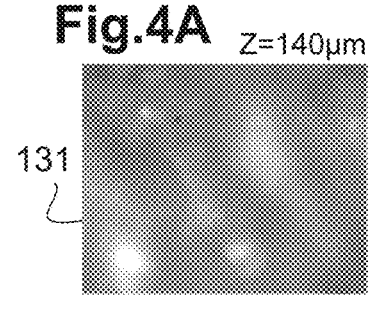 131
Fig.4B Z=70μm 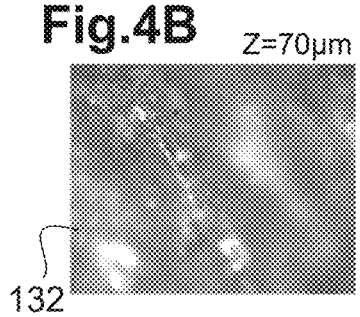 132
Fig.4C Z=0μm 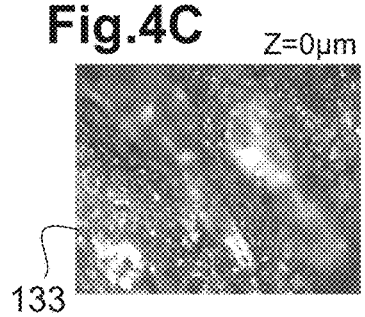 133
134 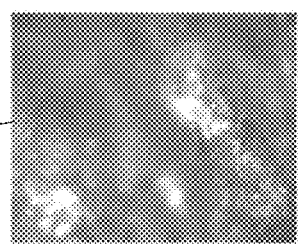
Fig.4D Z=-70μm
135 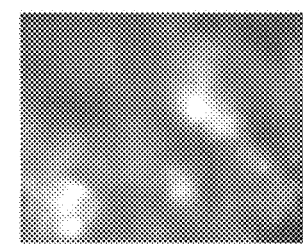
Fig.4E Z=-140μm
141
Fig.4F ViewSharp
Fig.5
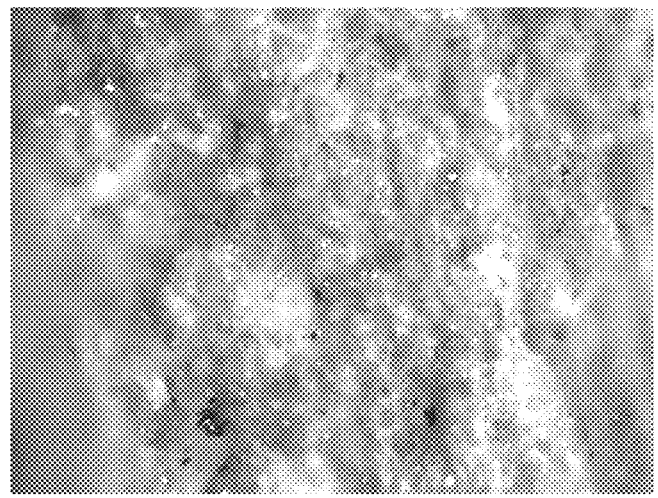
Fig.6
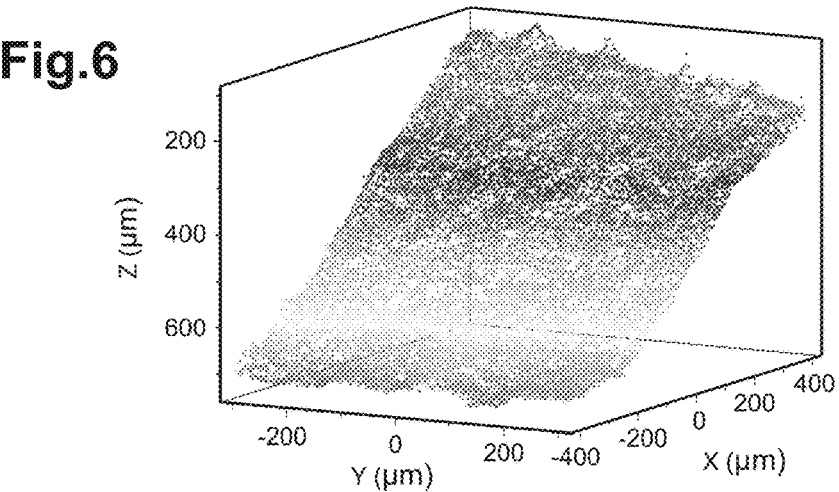

MICRO-SPECTROMETRY MEASUREMENT METHOD AND SYSTEM

TECHNICAL FIELD OF THE INVENTION

The invention relates to a method and system for visualizing and mapping the surface of a sample in two-dimensions (2D) or three-dimensions (3D) over a broad spatial range, for example from millimetric scale to micron scale, and with high lateral and axial resolutions in order to perform microspectrometry measurements in a precisely selected region of interest (ROI).

The invention also concerns a method and system for easy navigation on a sample surface with high precision and over a broad spatial range, for example from millimetric to micron scale, in order to select a region of interest (ROI) for performing spectrometric analysis or spectroscopic imaging, such as for example photoluminescence (PL) or Raman imaging.

BACKGROUND INFORMATION AND PRIOR ART

Recent two decades have seen drastic progress in PL and Raman spectrometer developments due to huge advances in photon detectors and light source developments. Photon detection systems include in particular CCD, EMCCD and CMOS cameras and new generations of avalanche photodiodes and photomultipliers with improved characteristics. New light sources include compact solid state lasers covering spectral range from UV light to near infrared light with average power of tens of mW, well enough to produce PL or Raman signal.

An important breakthrough in PL and Raman techniques development resulted from the combination of spectroscopy and microscopy techniques. Despite the fact that both techniques are very old, recent developments in electronics and photonics have enabled important innovations.

In particular, modern microscope spectrometers comprise autofocus systems to find and follow the sample surface. The principals of functioning of autofocus systems have optical or numerical origins.

The optical hardware autofocus systems use a laser to measure the distance to sample surface or white light interference to keep the distance to the surface constant. They can also use the intensity of the light reflected from the sample surface or intensity of the sample spectral response to identify the sample surface location through the maximum of the measured signal. In general all optical hardware autofocus systems are point by point measurement methods and demand a time to collect the information from an area of N by N pixels. In function of time spent on one pixel and of number of pixels the total time can vary from minutes to several hours. Another disadvantage of optical autofocus methods is their sensibility to the nature of the sample surface. In case of strongly diffusive, semi-transparent, inclined, or relief surface the method will provide incorrect results or even will not work at all. Moreover, the price of the optical hardware autofocus device increases the total cost of microscope spectrometer.

The alternative to use of optical hardware autofocus systems is the use of digital or numerical autofocus systems. These systems don't bring any additional cost into device as they are using already present video image hardware as optical objective lenses, light transmission optics and detection devices as CMOS or CCD cameras. Only investment is development of mathematical algorithm integrated into software to find and keep the focus on studied or measured samples. Such systems are already developed and found common use in the digital photo cameras, smart phones or digital microscopy. In every particular realization the inventors proposed their particular solution of hardware and software realizations and the applications differ from device to device. The important advantage of the digital autofocus is a large working area corresponding to a field of view. Digital autofocus proceed with millions pixels measurements simultaneously. Digital autofocus systems are generally based on image contrast or sharpness analysis. Their software comprises an algorithm that analyses the images contrast or sharpness as a function of z coordinates and determines the best focus position. The correspondence of the high contrast or sharp image to sample location in focus made possible this software approach.

For rather flat, smooth samples, autofocus permits to sharply visualize the whole field of view. However, most samples present a rough surface with significant variation along OZ axis which requires running the optical autofocus at each point of ROI for sample surface visualization and for PL or and/or Raman surface imaging. As mentioned above, this is a major drawback of optical hardware autofocus systems for the reason that it is highly time consuming. Moreover, it is difficult for a user to select a region of interest (ROI) for performing PL or Raman measurements of a sample because a part of sample surface inside of the field of view of a microscope objective would be blurred. Thus, it is difficult to ascertain the ROI area during use thereof.

SUMMARY OF THE INVENTION

Therefore, in order to remedy the drawbacks of the prior art, one object of the invention is to provide an optical micro-spectrometry system comprising an optical microscope comprising a sample holder for holding a sample to be analyzed and at least one microscope objective defining an optical axis (OZ), a spectrometry system comprising a light source adapted for generating an excitation light beam, a spectrometer and a detection system, an optical system adapted to direct the excitation light beam on the sample through said at least one microscope objective and to collect a Raman or photoluminescence light beam generated by scattering of the excitation light beam on the sample, the optical system being adapted to direct said Raman or photoluminescence light beam toward said spectrometer and said detection system and an actuating system for driving a relative lateral and/or axial movement between the sample holder and the at least one microscope objective.

According to the invention, the optical micro-spectrometry system comprises another light source for generating an illumination beam, an imaging system arranged in combination with said at least one microscope objective and configured for acquiring a first image of the sample and for acquiring a second image of the sample, the first image and the second image being formed by reflection or transmission of the illumination beam from a sample surface, the first image having a large field of view and the second image having a small field of view, a processing system configured for determining an area in a coordinate system of the first image corresponding to the small field of view of the second image, a display system configured for displaying the first image, the second image, and for displaying a graphical representation of said area in overlay on the first image, a user interface configured for selecting a region of interest in the first image and/or in the second image, the actuating system being configured for positioning said region of interest so as to receive the excitation light beam, and the spectrometry system being configured for detecting the Raman or photoluminescence light beam generated from said region of interest.

According to a particular and advantageous embodiment, the at least one microscope objective comprises a low magnification objective and a high magnification objective, and wherein the low magnification objective is configured to form the first image on the imaging system and the high magnification objective is configured to form the second image of the sample on the imaging system.

According to a particular and advantageous aspect, the imaging system is adapted for acquiring the second image in real time, the processing system being adapted for updating in real time the area corresponding to the second image and the display system is adapted for displaying the second image in real time and the graphical representation of the updated area in real time.

Preferably, the user interface comprises an integrated computer mouse, a trackball, a joystick, a touchpad and/or a touch screen, said user interface being adapted for interacting with the first image or, respectively, the second image, using drag and move operation so as to move the large field of view in the first image or, respectively, the small field of view in the second image, by a determined lateral displacement and wherein the actuating system is adapted for driving a relative lateral movement (dX and/or dY) proportional to the determined lateral displacement in the first image or, respectively, in the second image.

According to another particular and advantageous aspect, the actuating system comprises a driving unit configured for modifying an axial position of the at least one microscope objective relatively to the sample holder along said optical axis, the imaging system is configured for acquiring a plurality of images of the sample at a plurality of axial positions Z along said optical axis (OZ), the processing system is configured to calculate a mean square differences of neighboring pixel intensities in a center area for each image of the plurality of images, and to evaluate therefrom an image sharpness for the center area of each of said plurality of images, the processing system is configured to deduce therefrom a focus position on the center area, and the imaging system is configured to acquire said first image and/or said second image at said focus position on the center area.

According to a particular embodiment, the focus position on the center area is determined by computing a mean square difference (MSD) value for each of said plurality of images, and a profile of the mean square difference value as a function of said plurality of axial positions (Z) and wherein the focus position on the center area is determined by computing a maximum of said profile of the mean square difference value.

According to a particular embodiment, said image sharpness is evaluated by computing a mean intensity derivative in a center area for each of said plurality of images and a mean intensity profile derivative as a function of said plurality of axial Z positions and wherein a near focus position range is determined by displacement in axial direction (OZ) toward a maximum of said mean intensity profile derivative.

Advantageously, the processing system is configured to deduce therefrom a surface topography map.

According to another particular and advantageous aspect, the processing system is configured to determine a plurality of column vectors of pixels (Px, Py) for said plurality of images of the sample as a function of said plurality of axial positions (Z) along the optical axis, the processing system (40) is configured to evaluate a sharpness profile or a contrast profile, using a mean square difference or variations of a gradient or of a first derivative profile or, respectively, a second derivative profile for each of the plurality of column vectors of pixels (Px, Py) and an associated confidence level value, the processing system is configured to analyze said sharpness or contrast profile, for each of said column vector of pixels (Px, Py) with the associated confidence level value and to deduce therefrom a focus position for each of the plurality of column vector of pixels (Px, Py), and the processing system is configured to determine three-dimensional coordinates of the focus position and corresponding pixel intensity for each of the plurality of column vector of pixels (Px, Py) and to build a sample topography image representing the sample surface in three-dimensions.

A further object of the invention is to provide a microspectrometry measurement method comprising the following steps:
  determining current position of a sample stage of an optical microscope;
  generating an illumination light beam directed toward a sample arranged on the sample stage;
  selecting a microscope objective on the optical microscope;
  acquiring a first image formed through said optical microscope by reflection or transmission of the illumination light beam from a sample surface, the first image having a large field of view;
  storing the first image in a data storage unit,
  displaying the first image on a display system;
  acquiring a second image formed through said optical microscope by reflection or transmission of the illumination beam from the sample surface, the second image having a small field of view, that is smaller than the first image field of view;
  displaying the second image on the display system;
  determining an area in a coordinate system of the first image corresponding to the second image of the small field of view;
  displaying a graphical representation of said area in overlay on the first image;
  selecting a region of interest in the first image and/or in the second image displayed on the display system; and
  positioning the sample so as to direct an excitation light beam on the region of interest of the sample through said microscope and collecting a Raman or photoluminescence light beam generated by scattering of the excitation light beam on the region of interest of the sample.

Preferably, the method comprises further detecting the Raman or photoluminescence light beam using a spectrometer system.

In a particular embodiment, the first image and second image are formed using a same microscope objective defining an optical axis, and the step of acquiring the first image comprises acquiring a plurality of images at a plurality of predetermined positions in a plane transverse to the optical axis and forming the first image by tiling said plurality of images as a function of their predetermined positions.

In another particular embodiment, the first image is formed using a low magnification objective and the second image is formed using a high magnification objective.

Advantageously, the method further comprises the following steps:
  using a microscope objective for acquiring a plurality of images of the sample at a plurality of relative axial (Z)

positions of the sample holder with respect to the optical microscope, said relative axial (Z) positions being taken along said microscope objective optical axis;

evaluating sharpness in a center area for each image of said plurality of images;

deducing a focus position in the center area from the sharpness evaluated for said plurality of axial Z positions;

positioning the sample at said focus position in the center area, and wherein the step of acquiring said first image and/or said second image is done at said focus position.

Advantageously, the method further comprises computing a mean intensity derivative in the center area for each of said plurality of images, determining a mean intensity derivative profile as a function of said plurality of axial Z positions and displacing the sample holder in direction of a minimum of said mean intensity derivative profile so as to determine a near focus position range, prior to determining the focus position.

In a particular embodiment, said near focus position range is found using a mean intensity for each of said plurality of images and wherein said near focus position range is found through a computing of the first order derivative of said mean intensity as a function of said plurality of axial Z positions and further sample Z displacement in the direction of the minimum of computed derivatives until MSD variation become nonzero, defining thus near focus Z range.

In a particular embodiment, the step of evaluating sharpness is deduced from a mean intensity difference value in the center area for each of said plurality of images and from a mean square difference (MSD) profile as a function of said plurality of axial Z positions and wherein the focus position is determined by computing a maximum of said mean square difference profile.

In still another embodiment, the step of evaluating sharpness is deduced from computing an image gradient in a center area of each of said plurality of images, and from computing an image gradient profile as a function of said plurality of axial Z positions and wherein said focus position is determined by computing a maximum of said image gradient profile.

According to another particular aspect, the micro-spectrometry measurement method further comprises the following steps:

determining a plurality of column vectors of pixels (Px, Py) for said a plurality of images of the sample as a function of said plurality of axial positions (Z) along the optical axis (OZ);

evaluating a sharpness profile or a contrast profile, using a mean square deviation, a variation, a gradient, a first derivative profile or, respectively, a second derivative profile, and an associated confidence level value, for each of the plurality of column vectors of pixels (Px, Py);

analyzing said sharpness profile or contrast profile with the associated confidence level value for each of the plurality of column vectors of pixels to deduce therefrom a focus position for each of the plurality of column vectors of pixels; and extracting the three-dimension coordinates of the focus position and corresponding pixel intensity, saving the three-dimension coordinates of the focus position and corresponding pixel intensity into the storage unit 45.

using the three-dimension coordinates of the focus position and corresponding pixel intensity to build a sample topography image Z(X,Y) and/or a three-dimension sample surface image.

This system and method enable Raman signal acquisition in a selected region of interest (ROI) while providing fast and easy navigation on sample's surface.

Preferably, the region of interest for Raman or PL measurements is selected among: a rectangular area, a disk-shaped area, a user designated area, a line, a set of randomly selected points and a set of user designated points.

This method and system are fast and require no additional hardware component.

BRIEF DESCRIPTION OF THE DRAWINGS

The invention will be better understood when referring to the appended drawings wherein:

FIG. 1 schematically represents an apparatus combining an optical microscope, a photoluminescence or Raman spectrometer and a visualization device;

FIG. 2 shows an example of a first image and a second image of a patterned sample displayed on a visualization device, and showing the borders of the area corresponding to the second image in overlay on the first image;

FIG. 3 shows another example of a first image and a second image of another sample obtained using in addition an autofocus process;

FIGS. 4A-4E show a few images from a stack of images acquired for a rutile sample using a 10X objective lens taken at different Z axial positions, and, respectively, FIG. 4F shows a reconstructed focused image based on a treatment of from a stack of images including images 4A-4E;

FIG. 5 shows a virtually sharpened image of an aspirin tablet sample in 2D obtained with 10X objective and FIG. 6 shows the corresponding surface topography map;

DETAILED DESCRIPTION OF EXAMPLE(S)

Figure 7:
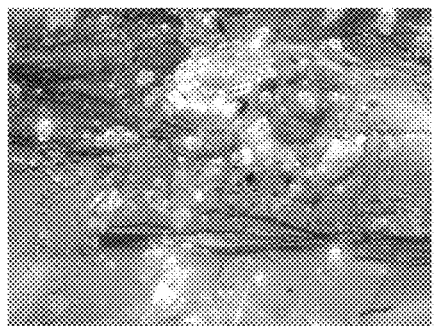
FIG. 7 shows a reconstructed 2D focused image of a gypsum sample using a 100× objective lens and FIG. 8 shows the corresponding all-in-focus 3D reconstructed surface topography.

Herein is disclosed a new digital approach for automatic focus finding for sample surface during sample movement or sample surface navigation, simultaneous visualization of whole sample surface inside of field of view, registering of this omnifocal sample surface inside of the field of view for further combination in mosaic image and easy navigation on large sample image with zoom on its details for the purpose to select a precise and sophisticate ROI for further PL and Raman measurements and sample surface imaging.

Device

A first aspect of the present disclosure concerns a new system and method for PL or Raman signal acquisition providing easy navigation on a sample surface.

FIG. 1 schematically shows a system combining an optical microscope 10, a photoluminescence or Raman spectrometry system 50, a processing system 40 and a display device 44.

The optical microscope 10 comprises generally a microscope stand, at least one objective lens 11 and a sample holder for holding a sample to be analyzed. The objective lens 11 defines an optical axis OZ that is generally vertical.

Preferably, the optical microscope 10 comprises a low magnification objective 11 and a high magnification objective 12.

The microscope 10 generally comprises motorized actuators 20 for moving the sample stage relatively to the objective lens 11 in three dimensions. For example, the sample stage may be mounted on an XY scanning stage so as to translate the sample along X and/or Y directions and the microscope body is equipped with a Z stage enabling to move the microscope objective lens 11 along the OZ axis so as to adjust focusing. Alternatively, the sample stage may be mounted on an XYZ scanning stage enabling to move the sample in 3D. Alternatively or complementarily, the sample stage may be mounted on a rotating stage.

Within the present document, we consider an XYZ orthonormal coordinate system wherein the OZ axis corresponds to the optical axis of the microscope, and wherein the OX axis and OY axis are transverse to the OZ axis. Generally, the OZ axis is vertical.

The optical microscope 10 includes an illumination turret comprising a beam splitter 13 used to direct the illumination light into objective, a switching mirror 14 used for coupling microscope with spectrometer and a tube lens 15 used to produce a sample image on CMOS camera. Further, the optical microscope 10 comprises a white light source 18 and an illumination condenser 17. The white light source 18 consists for example in a LED or halogen lamp. The white light source 18 generates a white light beam that is directed on the illumination condenser 17. The illumination condenser 17 forms an illumination light beam that is reflected on the beam splitter 13 toward the sample surface.

In addition, the optical microscope 10 comprises a video camera 16 for acquisition of video images of the sample surface. The video images of the sample surface are formed using reflected light if the optical microscope 10 is configured to operate in reflection, or, respectively, using transmitted light if the optical microscope 10 is configured to operate in transmission.

The PL or Raman spectrometry system 50 comprises a laser light source 51, a Rayleigh filter 52, coupling optics 54, a spectrometer 55 and a CCD camera 60. The laser light source 51 generates an excitation light beam at a determined wavelength. On the input path, the Rayleigh filter 52 transmits the excitation light beam toward a switching mirror 14 in the beam path of the optical microscope so as to direct the excitation light beam toward the sample surface. The objective lens 11 focuses the excitation light beam on the sample. The switching mirror 14 enables to direct or not the excitation light beam toward the sample surface. The objective lens 11 collects a light beam that is back-scattered by the sample and returns the back-scattered light beam toward the switching mirror 14. On the return path, the Rayleigh filter 52 separates Rayleigh scattered light, at the wavelength of the laser, from PL or Raman scattered light. For example the Rayleigh filter 52 comprises a notch type injection-rejection spectral filter. Optionally, a confocal pinhole 53 is arranged so as to select Raman or PL light beam from a specific plane in the sample. The coupling optics 54 focus the PL or Raman scattered light on the entrance slit of the spectrometer 55. The CCD camera 60 is arranged at the output of the spectrometer 55 so as to detect PL or Raman spectra.

Generally, the micro-spectrometry system comprises a processing system 40 including an acquisition unit 41, a treatment unit 42, a control unit or central processing unit 43 and a data storage unit 45. The acquisition unit 41 acquires images from the video camera 16 and/or, respectively, spectra from the CCD camera 60. The treatment unit 42 performs numerical processing on the acquired images and/or on spectra. The central processing unit 43 coordinates the operations of the scanning stage(s) 20, white light source 18, switching mirror 14, laser light source 51, Rayleigh filter 52, confocal pinhole 53, switching mirror 14 and spectrometer 55.

Finally, the micro-spectrometry system comprises a display device 44 consisted of one screen or several screens. The display device 44 is connected to the central processing unit 43. For example, the display device 44 displays in real time images of the sample acquired on the video camera 16 and/or spectra measured using the CCD camera 60 at a point of that sample.

We will now describe the configuration and operation of such a microspectrometry system according to a first aspect of the present disclosure that provides a navigation map at the sample scale for selecting a ROI and performing Raman or PL spectrometry measurements in that ROI.

For example, the microscope uses a first objective lens 11 having a low magnification of 4×, 5× or 10×.

A motorized or piezo-actuated XY scanning stage 20 is used to drive displacement in X and/or Y directions during the sample's surface investigation or visualization. Preferably, the microscope comprises a motorized Z stage or a piezo-actuated Z stage for relative displacement between the sample stage and the objective lens along OZ axis. The control unit 43 receives the current position of the XYZ stage in real time.

Using the first objective lens 11 of the microscope, the microscope camera 16 detects a first image 71 of a sample surface obtained by reflection of the white light beam on the sample surface. The microscope camera and first objective lens are calibrated so as to determine a coordinate transfer function between the XY stage and the coordinates of array of pixels of the camera 16 combined with the first objective lens. Thus, each pixel of the first image 71 has determined positions in the XY coordinate system of the sample stage. The first image 71 is stored in a virtual image space allocated in the data storage unit 45. This first image 71 is used to initialize the content of a navigation map as illustrated on FIG. 2. The first image 71 is stored in the data storage unit 45. The first image 71 is also displayed on the display device 44 as a static image.

Then, a second objective lens 12 replaces the first objective lens 11. The second objective lens 12 is a high magnification objective, for example 50× or 100×. Preferably the first objective lens 11 and the second objective lens 12 have the same optical axis (OZ). Alternatively, a calibration is used to determine an offset between the optical axis of the first objective lens 11 and the second objective lens 12. The processing unit 40 stores the magnification power corresponding to each objective lens, and possibly the offset. Similarly as with the first objective lens, the microscope camera and second objective lens are calibrated so as to determine a coordinate transfer function between the XY stage and the coordinates of the array of pixels of the camera 16 combined with the second objective lens. Optionally, a motorized Z stage or a piezo-actuated Z stage is used to adjust focus.

The second objective lens 12 enables to zoom a particular region on the sample and to acquire a second image 72 of the same sample surface by reflection of the white light beam on the sample surface. Each pixel of the second image 72 has determined positions in the XY coordinate system of the sample stage. The CMOS video camera 16 records the zoomed region as a live video or as an image. This second image 72 (static or live) is displayed on the screen 44 as shown on FIG. 2 (right side). Due to the higher magnification, the second image 72 presents a narrow field of view that is, preferably at least partially, included in the field of view of the first image 71. The field of view on the camera 16 has generally a rectangular shape.

Alternatively, the microscope system uses a single microscope objective lens to form the first image 71, which is a panoramic image, and the second image 72 with a small field of view. In this case, the first image 71 is obtained by acquiring a plurality of images taken at a plurality of X, Y positions and by panning this plurality of images as a function of their respective positions, so as to obtain a panoramic first image 71, providing a large field of view of the sample.

In all cases, a first image 71 is acquired with a large field of view and a second image 72 is acquired of the sample with a small field of view. The first image and the second image may be displayed on separate screens. Alternatively, the first and second images are displayed in separate windows on the same screen, for example using mosaic windows.

Moreover, the processing unit 40 calculates the position of a rectangular box corresponding to a field of view of the second image 72 in the coordinate system of the first image 71. An image 73 of the borders of this rectangular box is displayed in overlay on the first image 71 on the display device 44. Thus, we obtain a navigation map comprising the first image 71 and the rectangular box 73 displayed in overlay. The navigation map also includes the second image 72 that is displayed simultaneously next to the first image 71. The second image 72 provides a zoom on a narrow field of view, generally with higher spatial resolution and lower depth of field than the first image 71. The second image 72 is updated in real time as a function of the current position of the XY stage. Concurrently, the positions of the borders of the rectangular box 73 are also updated in real time as a function of current position of the XY stage.

The processing unit 40 is also used to drive actuators for moving the sample stage relatively to the microscope objective. For example, the processing unit moves the sample stage in X and/or Y direction(s). In real time, the camera 16 records an updated second image 72. The processing unit calculates and updates also in real time the position of the rectangular box 73 on the display device 44.

The user visualizes simultaneously the images 71, 72 and 73 and uses them for easy navigation on the sample surface, using any input device such as an integrated computer mouse, trackball, joystick, touchpad or touch screen. The user can easily use a "drag-and-move" function on the second image 72 (microscopic image). The XY stage moves in real time to display the real time second image at the desired XY position. The user can also click on or touch to select an area on the first image 71 in order to move the sample toward that area.

Thus, the user easily controls the relative movement on the sample surface by viewing simultaneously the first image 71, the second image 72 and the rectangular box 73.

The user can easily select a region of interest on the sample and determine the direction of the movement.

Alternatively and/or complementarily, the rectangular box 73 is moveable to a target position using an appropriate user interface. The user interface comprises for example a computer mouse or a touchpad or a touch screen or any other interactive device. The control unit 43 detects the movement of the rectangular box 73 on the display device 44 and calculates the corresponding displacement of the XY stage. The control unit 43 drives the scanning stage 20 so that it applies a corresponding displacement to the XY scanning stage. Thus, an automatic displacement of the XY stage to a target position may be controlled by a user interface and visually on display device 44.

When the XY stage has moved to the desired ROI, the user can trigger a PL or Raman spectra acquisition in the selected ROI.

Thus, the system provides a visually interactive navigation through the sample's map. This system and method offers a unique experience in terms of sample exploration and analysis. It makes the finding of a region of interest for Raman or PL measurement a lot easier.

This system enables to navigate on a zoomed sample's surface and to visualize sample surface details. The sample shown on FIG. 2 has a generally flat surface and presents features having a high contrast.

Thus, the sample's first image 71 obtained with a low magnification objective and a large field of view provides a navigation map having a coordinate system. At the same time, the zoomed sample's second image 72 obtained with high magnification objective and containing sample's surface details is positioned in the coordinate system of the first image. This technique permits the user to have simultaneously global sample vision and sample' surface details vision in the region of interest.

However, some samples may present a rough or textured surface and/or a surface topography having larger features than the depth of focus of the microscope objective lens. Such samples generally produce video images that are at least partially blurred. Also, using a confocal system, the first image 71 and/or second image 72 may be at least partially blurred due to being out-of-focus. Blurred images of the sample hinder easy navigation on the sample's surface, because detailed features are invisible. It is also more difficult to determine a ROI on the sample surface and to obtain precise Raman or PL microspectrometry data.

A second aspect of the present disclosure concerns Z stage displacement combined with rapid images acquisition using the CMOS camera 16, so as to keep the field of view of the objective lens all time focused on sample's surface during navigation (see FIG. 3).

This technology is called herein NavSharp standing for sharp navigation on a rough, textured sample surface or on a surface relief. This technology is combined with navigation map technique disclosed in the first aspect so as to provide sharp navigation on rough, textured or relief samples.

The system uses a computer-controlled motorized or piezo XY stage. A motorized or piezo microscope Z stage is used for displacement along OZ axis. The control unit 43 moves the XY stage in user selected position. The video camera 16 acquires a sample image at current axial Z position. The control unit 43 moves Z stage on objective predetermined distance and camera 16 acquires another image. For each acquired image, the treatment unit 42 proceeds with image analysis. The treatment algorithm is applied to the center area of image. In the following description of the second aspect (NavSharp description), the term image analysis means that it is applied to its center area, consisting of a few tens of pixels.

Here, the image treatment unit 42 evaluates image sharpness based on the combination of the mean square differences (MSD) of image pixel intensities in X and Y directions in the center area of each acquired image and for the corresponding axial Z position.

Within the present disclosure, MSD is defined as follows:

$$MSD=(\Sigma(I_{x+d,y}-I_{x-d,y})^2+\Sigma(I_{x,y+d}-I_{x,y-d})^2)/(2*M*N)$$

Where $I_{x,y}$ represents the image intensity of pixel with {x,y} coordinates, $\Sigma$ represents the sum for all x and y coordinates inside the center area of M*N pixels, and d represents a lateral distance parameter.

In details, to evaluate an image sharpness at different axial Z positions, we calculate a MSD for short distances (few pixels) and respectively a MSD for long distances (few tens pixels). The comparison of the MSD for short distances for the image at different axial Z positions permits to find the MSD maximum which defines the position of the best focus for image. The comparison of the MSDs for long distances for unfocused images at different Z permits to evaluate which of them is closer to the focus. The treatment unit 42 makes a decision on next Z movement based on both MSDs. If the current axial Z position is too far from focus, the value of the MSD for long distances doesn't permit to find direction to the focal plane. In this case, we are using the intensity of the reflected light acquired by camera 16. The treatment unit 42 calculates a mean image intensity at each axial Z position and its derivative with respect to Z. The control unit 43 moves the sample stage in the direction of a minimum of the derivative and in parallel the treatment unit 42 calculates the MSD for acquired image. Once the ratio of the MSD for newly acquired and previously acquired images is higher than a predefined threshold level, the treatment unit 42 switches to MSD method of focus finding. In the present disclosure, we state that the position of derivative minimum is inside of a range of axial Z positions close to focus that corresponds to appearing of significant MSD variations. We confirmed this statement empirically in the experiments with different kind of samples.

Two or more images at different axial Z positions and nearly the same (shifted less then a quarter of the analyzed area) XY positions are needed to make a decision on the next movement. The treatment unit 42 analyses Z profiles composed of MSD and mean intensity of acquired images.

If the Z profile of MSD clearly indicates the position of a maximum inside the profile zone, the control unit 43 moves the Z stage to the axial Z position corresponding to the found MSD maximum and stores this Z focus position and the corresponding XY position. In another case, if MSD profile has a maximum at lowest or, respectively, highest axial Z position in the measured range, then the control unit 43 moves the Z stage to another axial Z position below or, respectively, above the measured profile range. The image acquisition as a function of Z is resumed, and the MSD profile is updated. If the maximum is located inside the measured profile range than a new MSD profile maximum is searched with decreased Z displacements until Z focus position is found. The control unit 43 moves the Z stage to the new axial Z position corresponding to the found MSD maximum and stores this Z focus position and the corresponding XY position.

If the MSD profile is nearly flat, the Z movement direction cannot be found. In this case, the treatment unit 42 analyses the Z profile of mean intensity. This analysis requires measurements at least at three axial Z positions with large distances between them in order to evaluate the Z profile of mean intensity. The control unit 43 moves the Z stage to these axial Z positions and the camera 16 acquires the corresponding images. The treatment unit 42 determines the direction of the movement along OZ axis depending on the minimum of Z profile of mean intensity derivatives. The control unit 43 moves the sample stage in this direction and in parallel the treatment unit 42 calculates the MSDs for acquired images to find their maximum which determines the focus position. The Z stage is moved to the found focus position.

For every acquired image, the treatment unit 42 calculates MSD and mean image intensity and saves them together with current 3D (X,Y,Z) position in the data storage unit 45. Every time when user moves the stage to some X,Y position control unit 43 checks the stored values and select them if their X,Y values are shifted on less than a quarter size of the center area from actual position. In case if such selected values for different measurements are enough to define the focus position the control unit 43 moves the stage directly to determined position. Otherwise, the processing system 40 acquires the missing data to proceed with focus position finding. The proposed algorithm provides a smart live procedure for focus finding. When navigating on a region of interest that was already scanned previously, the best focus plane is directly selected.

Thus, the processing system 40 acquires several images at different Z axial positions by moving rapidly the Z stage and using one or a combination of methods to detect each next potential target candidate: z value, select the sharpest plane and then move the stage so the user can see the sample at the best focus in an automatic manner.

Thus, the sharp navigation method enables automatic focusing on the sample surface in the center area of the image by adjusting controllable Z axial position in real time. This automatic focus applies during XY stage movement and real time update of the acquired images. Also, the user can select a ROI that is not in the center of the image, use the drag-and-move function to place the ROI in the center of the field of view of the camera so that the automatic focus be performed on the selected ROI.

Moreover, in order to speed up the selection of the focus plane and also to facilitate its finding, the Z profile of the derivative of the mean intensity of image in reflected light is used to determine the Z direction for focus position finding.

The detection of an optimum focus Z axial position enables an easy navigation on the sample surface especially when using a confocal hole and/or when the sample has a rough, textured or relief surface.

This method permits the user to find easily a region of interest (ROI) on a sample. This method also permits to visualize sample's surface details using an objective lens and camera with limited field of view and using a motorized or piezo XY stage.

As an example, FIG. 3 shows a first image 71 of a mineral sample of gypsum in a right corner of a display device. The gypsum sample has a textured surface and a complex surface topography. FIG. 3 also shows a second image 72 of a zoomed area on the same gypsum sample and the rectangular box 73 displayed in overlay on the first image showing the area corresponding to the field of view of the second image 72. FIG. 3 also shows the position of a pixel 56 at the center of the second image. The second image 72 shown here is focused in the center area. However, the second image 72 appears blurred at other X, Y positions outside of its center area. FIG. 3 demonstrates the efficiency of the sharp navigation technique for navigating on complex sample's surfaces.

On the second image 72, the user can define graphically an area 74 corresponding to a ROI for Raman or PL measurements.

Example of FIG. 3 demonstrates that for a sample having a rough, irregular and rugged surface topography with Z variations larger than the depth of field of the objective lens

11, 12, the sample image is in focus only in the center area, but blurred in other parts, which hinders a navigation and a precise determination of the ROI as well as limits access to the sample surface for PL and/or Raman measurements.

Thus, a third aspect of the present disclosure was developed and provides a method for visualizing a sample surface over the whole field of view.

This third aspect is called view sharp standing for viewing sharply. It is used in combination with the sharp navigation and with the navigation map as detailed above.

The system uses a computer-controlled motorized or piezo-actuated microscope Z stage for displacement along Z axis, in order to position the explored sample on desired height. It also uses the camera 16 for rapid image acquisition in high resolution. We select one of the objectives 11 or 12 to proceed with acquisition of images in wide field microscope configuration in white light from user predefined Z range. In function of sample surface Z variations, the user selects z scanning range from "short", "standard", "wide" and "maximal" range's options. The minimal, zmin, and maximal, zmax, values of these ranges as well as the scanning steps, $\Delta Z$, are predefined in function of the selected objective and surface roughness.

The control unit 43 scans the sample surface inside of the selected Z range with selected $\Delta Z$ step using motorized or piezo-actuated microscope Z stage. For each Z position, the video camera 16 acquires an image 131, 132, 133, 134, 135 of the same XY area of the sample. In other words, the relative XY position of the sample remains unchanged during the Z scans. FIG. 4A shows for example an image 131 of a sample area taken in a Z=140 µm plane. FIG. 4B shows another image 132 of the same sample area taken in a Z=70 µm plane. FIG. 4C shows another image 133 of the same sample area taken in a Z=0 µm reference plane. FIG. 4D shows another image 134 of the same sample area taken in a Z=−70 µm plane. And, FIG. 4E shows another image 135 of the same sample area taken in a Z=−140 µm plane.

The stack of acquired images at a plurality of axial Z positions below and above the reference or working plane corresponding to a focused center area are stored in the data storage unit 45. Each acquired image comprises focused and out of focus or blurred areas. The stack of these images contains the information about the all-in-focus sample surface inside of the field of view which could be extracted and presented in 2D image for the case when we do not take in account the information about pixel Z position or in 3D image for the case when pixel Z position information is used to recreate image topography. The stored pixel values in form of the stack of images could be represented in the column vector form for every X,Y position. The column vector corresponding to X,Y position or X,Y column vector consists of pixel intensity values for the same X,Y position at every Z position used for image acquisition. In case of field of view characterized by N by M pixels the all pixels in acquired stack of images will be organized in N by M column vectors.

The image treatment unit 42 analyses every acquired image. Thus, the acquisition of the stack of sample's images is followed by their treatment in real time. Each acquired image is optionally treated to remove the noise and artifact and then it is sharpened by applying Laplacian operator in Z direction. Each pixel value I(z) is substituted with I(z)+dI(z), where dI(z) is a local differential calculated on pixel binned area. More precisely, dI(z) is calculated in next way dI(z)= (I(z)*2−I(z−1)−I(z+1))*coefficient, where the coefficient corresponds to different level of sharpening. This operation amplifies the observed sharpness to facilitate the maximum sharpness finding. Depending on the mathematical expression of Laplacian operator, it is possible to sharpen the acquired image presented by a matrix of intensity values, I (X, Y, Z), to different levels. It is possible to use the sharpened pixel value in a final ViewSharp image reconstruction.

The image treatment unit 42 applies pixel binning to every image in order to improve the sharpness detection. The pixel binned area, for example 3 by 3 pixels or 5 by 5 pixels, is used to calculate the MSD value. The obtained MSD value is appropriated to correspondent X,Y column vector at correspondent Z position. In such way calculated column vectors represent the X,Y MSD Z profile. The MSD Z profile is analyzed for its first and second maxima and based on the confidence level criterion the found first maximum is selected or not. The treatment unit 42 calculates a confidence value for each found first maximum. A confidence value, named here CV, is defined by the ratio of the first MSD maximum to the sum of the second MSD maximum and mean MSD value:

$$CV = MSD(z)_{max} / (\overline{MSD(z)} + MSD(z)_{max2}/2)$$

Based on empirical data the confidence levels (CL) equal to 2 (low), to 3 (medium) and to 4 (high) are introduced. The criterion for maximum selection is defined as follow. If the calculated CV is higher than CL, the treatment unit (42) selects the maximum value. Choosing a low confidence level may results in noise and false positive signal of MSD maximum value. In contrast, choosing a very high confidence level, may lead to a failure in detecting any MSD maximum value. In the case of textured, bright and homogeneously illuminated surface, the low or medium confidence level will be sufficient to find the sharpness maximum and reconstitute the sharp image of the all field of view. In the case of smoothed or badly illuminated surface the treatment unit 42 uses the high level of confidence and the CV may not be high enough to overcome CL. In this case an interpolation procedure is used to determine a MSD value using the found neighbor X,Y maximum MSD values for the same high confidence level.

The definition of criterion for maximum sharpness selection is critical because it impacts the accuracy of sample surface determination. It also defines the time needed for the ViewSharp procedure execution. This criterion actually defines the computer's memory and processor resources to be used for efficient procedure execution.

The treatment unit 42 applies a post-treatment to found values of MSD maximum describing a sharpness maximum. As an option, a smoothing is applied to remove artifact MSD values. For every found MSD maximum, the treatment unit 42 recovers the correspondent X,Y,Z coordinates and intensity value. The obtained coordinates could be used to present sample surface topography Z(X,Y). As control system 40 is using $\Delta Z$ step to scan sample surface, the recovered Z position values will be spaced by this step along Z axis forming the terraces on sample topography image. To approach the real surface, an interpolation step along OZ axis is applied based on analysis of the nearest neighbors' MSD values in OZ direction. Once the interpolation along Z axis is done, a continuous sample topography is obtained. The obtained sample surface topography image is reduced in X and Y directions due to pixel binning operation during sharpness calculation procedure. To restore the obtained sample topography image to the original size with high spatial resolution, the treatment unit 42 applies another interpolation procedure along X and Y directions to restore all Z values corresponding to original pixel positions. The treatment unit 42 provides the all-in-focus surface topography image, wherein the new image has the same number of pixel as original image. Thus obtained X,Y,Z values are used to build all-in-focus intensity 2D and 3D sample surface image wherein each new pixel intensity value corresponds to the intensity value of found maximum sharpness or interpolated intermediate intensity values.

The obtained X,Y,Z and correspondent intensity values are stored by storage unit. The surface topography or Z map of the sample surface is stored in memory by unit 45 and is visualized by display unit 44. The all-in-focus 2D and 3D sample surface intensity images is stored in memory by unit 45 and is visualized by display unit 44. FIG. 4F shows an example of such 2D reconstructed image 141. The reconstructed image 141 appears sharp over the whole field of view. This reconstructed image 141 may replace at least partially the first image 71 and/or replace the second image 72 displayed on the display device 44. The reconstructed image 141 enables easy navigation on a sample surface having a rough surface texture and/or an uneven surface topography. The reconstructed image 141 may also be used to update at least a part of the first image in the navigation map. Thus, the reconstructed image enables to visualize sample surface details and determine more precisely a ROI for Raman or PL measurements.

FIG. 5 shows an example of 2D all-in-focus surface intensity image of the another sample. The shown image corresponds to the field of view of the camera 16. We can see sharply all image surface. All blurred out of focus image zones were substituted by sharp in focus image zones. FIG. 6 shows the reconstructed surface topography image for the same sample. The sample surface topography image gives a general sample view, permits to visualize the surface details and serve for general evaluation of method performance.

Figure 8:
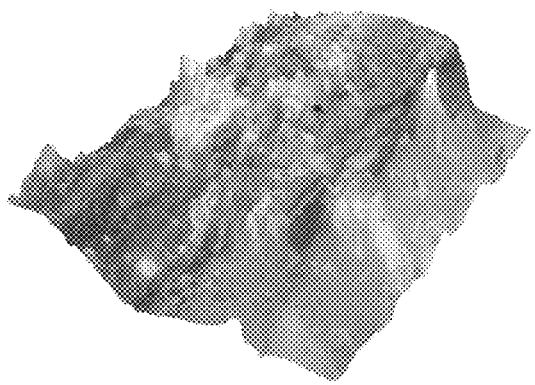

FIG. 7 shows another example of a 2D all-in-focus surface intensity image. We can see very sharp image of sample surface where Z variations is many times of the objective field of view. FIG. 8 shows the corresponding 3D image surface intensity profile based on recovered surface focus Z positions. This image presents the particularity of the surface relief and enables to precisely select the ROI in 3D space. The selected ROI is used to acquire Raman or PL spectra at every selected pixel. Thus, Raman or PL spectrometry measurements are obtained with high lateral and axial resolution. Raman or PL spectra are acquired with the spectrometer 55 and the CCD camera 60.

Raman or PL mapping is done by pixel by pixel scan of the ROI using found Z values for confocal acquisition of a spectrum from every pixel. Alternatively, the spectrum maximum or integral can be used as pixel value for image sharpening. Indeed, in a case where the excitation laser light does not penetrate into the sample, the Raman response can be used for all-in focus image reconstruction using contrast value or intensity value instead of the white light reflection.

Figure 9:
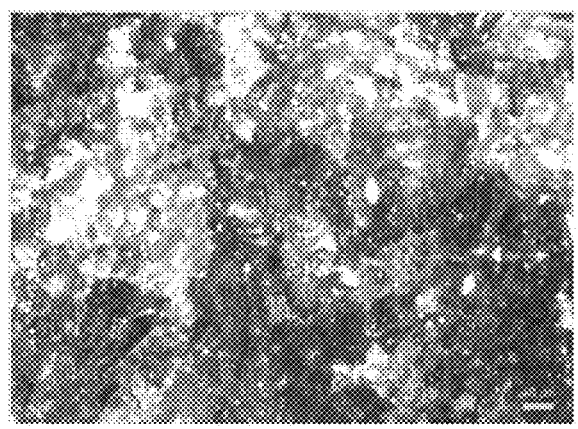
FIG. 9 shows a 2D surface topography image of a rutile sample at 100× and FIG. 10 shows the corresponding Raman spectrometry image.
Figure 10:
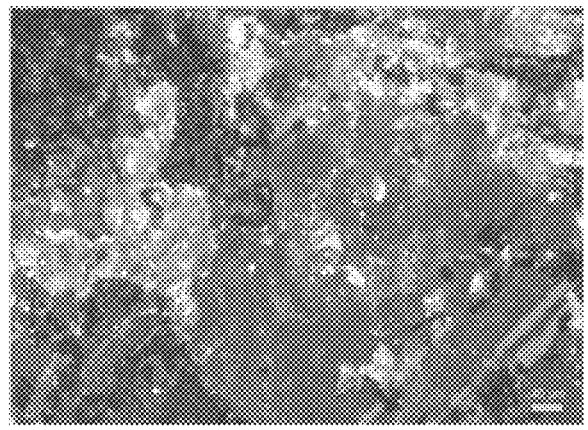

FIG. 9 shows another example of sharpened image treated according to the above disclosure. The white light reflected intensity is used to generate 3D surface profile using ViewSharp method disclosed herein. FIG. 10 shows the corresponding Raman mapping measured point-by-point at the focused Z axial positions determined from the topography map. It is observed that the Raman spectral map has excellent spatial resolution. The comparison of FIGS. 9 and 10 enables to analyze morphological features evidenced by the topography in view of Raman or PL measurements which give additional information about chemical composition.

The invention claimed is:
1. An optical micro-spectrometry system, comprising:
an optical microscope (10) comprising a sample holder for holding a sample to be analyzed and at least one microscope objective (11, 12) defining an optical axis (OZ);
a spectrometry system (50) comprising a light source (51) adapted for generating an excitation light beam, a spectrometer (55) and a detection system (60);
an optical system (14) adapted to direct the excitation light beam on the sample through said at least one microscope objective (11, 12) and to collect a Raman or photoluminescence light beam generated by scattering of the excitation light beam on the sample, the optical system (14) being adapted to direct said Raman or photoluminescence light beam toward said spectrometer (55) and said detection system (60);
an actuating system (20) for driving a relative lateral (dX, dY) and/or axial (dZ) movement between the sample holder and said at least one microscope objective (11, 12);
another light source (18) for generating an illumination beam;
an imaging system (16, 41) arranged in combination with said at least one microscope objective (11, 12) and configured for acquiring a first image (71) of the sample and for acquiring a second image (72) of the sample, the first image (71) and the second image (72) being formed by reflection or transmission of the illumination beam from a sample surface, the first image (71) having a large field of view and the second image (72) having a small field of view;
a processing system (40) configured for determining an area in a coordinate system of the first image (71) corresponding to the small field of view of the second image (72);
a display system (44) configured for displaying the first image (71), the second image (72), and for displaying a graphical representation (73) of said area in overlay on the first image (71); and
a user interface configured for selecting a region of interest in the first image and/or in the second image, the actuating system (20) being configured for positioning said region of interest so as to receive the excitation light beam, and
the spectrometry system (50) being configured for acquiring a Raman or photoluminescence signal generated from said region of interest,
wherein the actuating system (20) comprises a driving unit configured for modifying an axial position (Z) of the at least one microscope objective relatively to the sample holder along said optical axis (OZ),
the imaging system (16) being configured for acquiring a plurality of images of the sample at a plurality of axial positions (Z) along the optical axis (OZ),
the processing system (40) being configured to calculate mean square differences (MSD) of neighboring pixel intensities in a center area for each image of the plurality of images, and to evaluate therefrom an image sharpness for the center area of each of said plurality of images, and the processing system (40) being configured to deduce therefrom a focus position on the center area, and
the imaging system (16) being configured to acquire said first image (71) and/or said second image (72) at said focus position on the center area.

2. The optical micro-spectrometry system according to claim 1,
wherein said focus position on the center area is determined by computing a mean square difference (MSD) value for each of said plurality of images, and a profile of the mean square difference value as a function of said plurality of axial positions (Z), and
wherein the focus position on the center area is determined by computing a maximum of said profile of the mean square difference value.

3. The optical micro-spectrometry system according to claim 2,
wherein said image sharpness is evaluated by computing a mean intensity derivative in the center area for each of said plurality of images and a mean intensity profile derivative as a function of said plurality of axial Z positions, and
wherein a near focus position range is determined by displacement in axial direction (OZ) toward a maximum of said mean intensity profile derivative.

4. The optical micro-spectrometry system according to claim 2, wherein:
the processing system (40) is configured to determine a plurality of column vectors of pixels (Px, Py) for said plurality of images of the sample as a function of said plurality of axial positions (Z) along the optical axis (OZ);
the processing system (40) is configured to evaluate a sharpness profile or a contrast profile, using a mean square difference or variations of a gradient or of a first derivative profile or, respectively, a second derivative profile for each of the plurality of column vectors of pixels (Px, Py) and an associated confidence level value;
the processing system (40) is configured to analyze said sharpness or contrast profile, for each of said column vector of pixels (Px, Py) with the associated confidence level value and, to deduce therefrom a focus position for each of the plurality of column vector of pixels (Px, Py); and
the processing system (40) is configured to determine three-dimensional coordinates of the focus position for each of the plurality of column vector of pixels (Px, Py) and corresponding pixel intensity for each of the plurality of column vector of pixels (Px, Py), and to build a sample topography image representing the sample surface in three-dimensions.

5. The optical micro-spectrometry system according to claim 1,
wherein said image sharpness is evaluated by computing a mean intensity derivative in the center area for each of said plurality of images and a mean intensity profile derivative as a function of said plurality of axial Z positions, and
wherein a near focus position range is determined by displacement in axial direction (OZ) toward a maximum of said mean intensity profile derivative.

6. The optical micro-spectrometry system according to claim 5, wherein:
the processing system (40) is configured to determine a plurality of column vectors of pixels (Px, Py) for said plurality of images of the sample as a function of said plurality of axial positions (Z) along the optical axis (OZ);
the processing system (40) is configured to evaluate a sharpness profile or a contrast profile, using a mean square difference or variations of a gradient or of a first derivative profile or, respectively, a second derivative profile for each of the plurality of column vectors of pixels (Px, Py) and an associated confidence level value;
the processing system (40) is configured to analyze said sharpness or contrast profile, for each of said column vector of pixels (Px, Py) with the associated confidence level value, and to deduce therefrom a focus position for each of the plurality of column vector of pixels (Px, Py); and
the processing system (40) is configured to determine three-dimensional coordinates of the focus position for each of the plurality of column vector of pixels (Px, Py) and corresponding pixel intensity for each of the plurality of column vector of pixels (Px, Py), and to build a sample topography image representing the sample surface in three-dimensions.

7. The optical micro-spectrometry system according to claim 1, wherein:
the processing system (40) is configured to determine a plurality of column vectors of pixels (Px, Py) for said plurality of images of the sample as a function of said plurality of axial positions (Z) along the optical axis (OZ);
the processing system (40) is configured to evaluate a sharpness profile or a contrast profile, using a mean square difference or variations of a gradient or of a first derivative profile or, respectively, a second derivative profile for each of the plurality of column vectors of pixels (Px, Py) and an associated confidence level value;
the processing system (40) is configured to analyze said sharpness or contrast profile, for each of said column vector of pixels (Px, Py) with the associated confidence level value, and to deduce therefrom a focus position for each of the plurality of column vector of pixels (Px, Py); and
the processing system (40) is configured to determine three-dimensional coordinates of the focus position for each of the plurality of column vector of pixels (Px, Py) and corresponding pixel intensity for each of the plurality of column vector of pixels (Px, Py), and to build a sample topography image representing the sample surface in three-dimensions.

\* \* \* \* \*